(12) United States Patent
Noujeim et al.

(10) Patent No.: US 8,027,390 B2
(45) Date of Patent: Sep. 27, 2011

(54) METHOD AND SYSTEM TO EXTEND A USEABLE BANDWIDTH OF A SIGNAL GENERATOR

(75) Inventors: Karam Michael Noujeim, Sunnyvale, CA (US); Justin R. Magers, San Jose, CA (US)

(73) Assignee: Anritsu Company, Morgan Hill, CA (US)

( * ) Notice: Subject to any disclaimer, the term of this patent is extended or adjusted under 35 U.S.C. 154(b) by 722 days.

(21) Appl. No.: 12/132,427

(22) Filed: Jun. 3, 2008

(65) Prior Publication Data

US 2009/0296829 A1    Dec. 3, 2009

(51) Int. Cl.
H04B 3/00    (2006.01)

(52) U.S. Cl. .................. 375/257; 375/146; 375/344

(58) Field of Classification Search .................. 375/257, 375/146, 344
See application file for complete search history.

(56) References Cited

U.S. PATENT DOCUMENTS

2007/0087704 A1* 4/2007 Gilberton ............... 455/114.3

OTHER PUBLICATIONS

E8257D/67D PSG Signal Generators, Service Guide, Agilent Technologies, Aug. 2008, 299 pages.

* cited by examiner

Primary Examiner — Dac Ha
Assistant Examiner — Zewdu Kassa
(74) Attorney, Agent, or Firm — Fliesler Meyer LLP

(57) ABSTRACT

A system to extend an operating bandwidth of a signal generator comprises a signal generator, an output port, a first transmission line extending between the signal generator and the output port, a mixer adapted to receive a first signal from the signal generator, a local oscillator adapted to provide a second signal to the mixer to beat against the first signal, a second transmission line extending from the mixer to transmit a plurality of output signals of the mixer, and one or more channels couplable between the first transmission line and the second transmission line. The one or more channels include a first coupler having a length adapted to couple one or more of the output signals within a band of frequencies from the second transmission line to the channel, a second coupler having a length adapted to couple the one or more of the output signals from the channel to the first transmission line, and a filter arranged between the first coupler and the second coupler.

19 Claims, 3 Drawing Sheets

METHOD AND SYSTEM TO EXTEND A USEABLE BANDWIDTH OF A SIGNAL GENERATOR

BACKGROUND

Instruments based on current broadband signal-generator architectures make use of switched filters along a transmission line in order to implement frequency-band filtering of the output, thereby extending the operating frequency bandwidth of a low-frequency signal generator (LFSG). Frequency-dependent radio-frequency (RF) switch limitations such as loss and limited frequency bandwidth begin to take their toll on signal-generator performance as an operating frequency range of an instrument implementing such current architectures extends into the millimeter-wave spectrum. Consequences can include a decrease in the dynamic range of the instrument, and a severe bound on the instrument's operating bandwidth.

There is a need for alternative architectures that extend an operating bandwidth of a signal generator while removing or reducing limitations imposed by the presence of switches along the transmission line.

DETAILED DESCRIPTION

Figure 1:
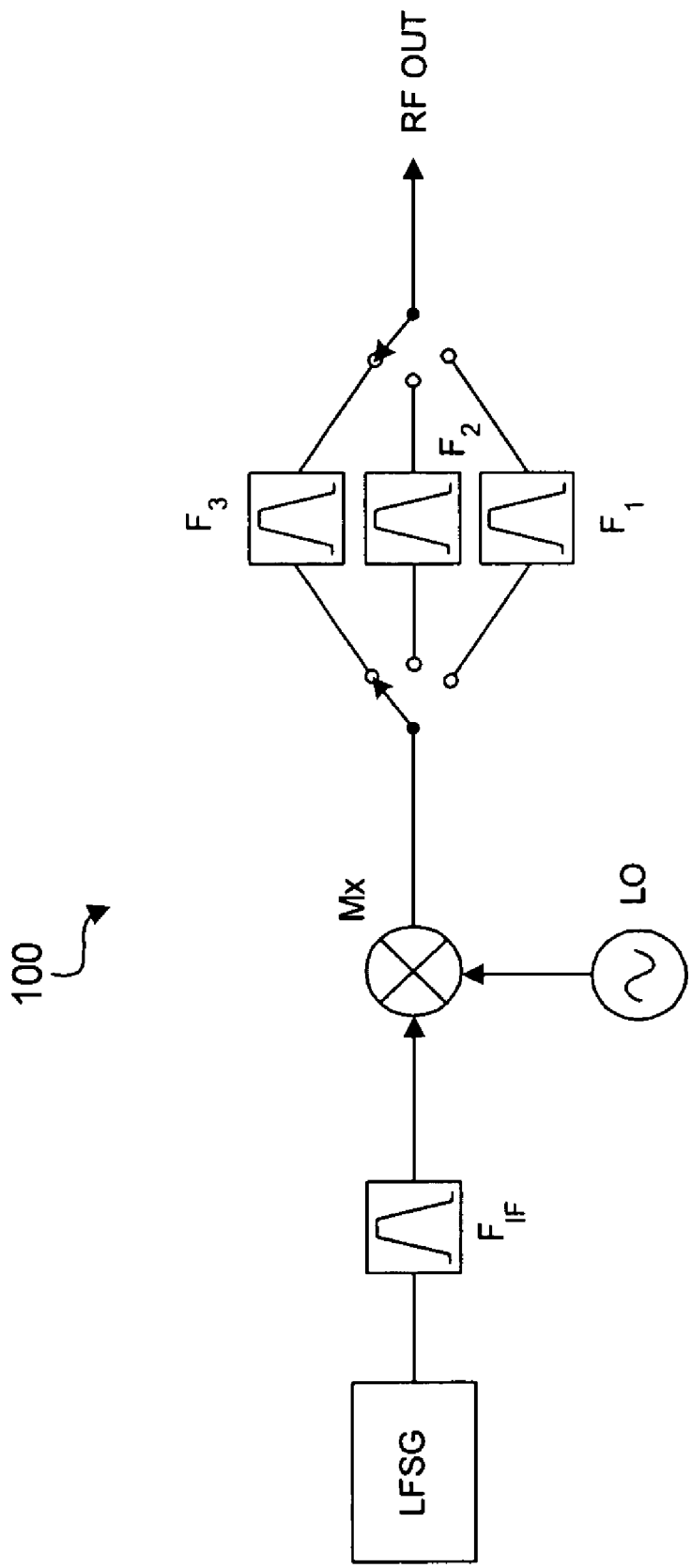
FIG. 1 is a circuit diagram of an architecture in accordance with the prior art for extending an operating bandwidth of a signal generator.

Referring to FIG. 1, a system 100 is shown illustrating a technique in accordance with the prior art for generating a signal. A low-frequency signal generator (LFSG) produces an intermediate frequency signal that is filtered and passed to a mixer Mx. A local oscillator (LO) generates an additional signal which is injected into the mixer Mx along with the intermediate frequency signal from the signal generator. The additional signal from the LO beats against the intermediate frequency signal to mix the intermediate frequency signal to a different frequency. The result is a series of beat frequencies. A desired frequency is selected by switching the signal through an appropriate filter (e.g., $F_1$, $F_2$, $F_3$) that passes the desired frequency but rejects the other beat frequencies. Components to generate, filter, direct and/or amplify signals typically increase in cost for instruments generating signals at progressively higher frequencies (e.g., above 40 GHz). Further, while switches typically have low loss when switching signals at lower frequencies, as signal frequencies increase the generated frequency can be unacceptably attenuated. For example, it has been observed that signals generated at frequencies of 70 GHz are typically attenuated by approximately 25% or more.

Figure 2:
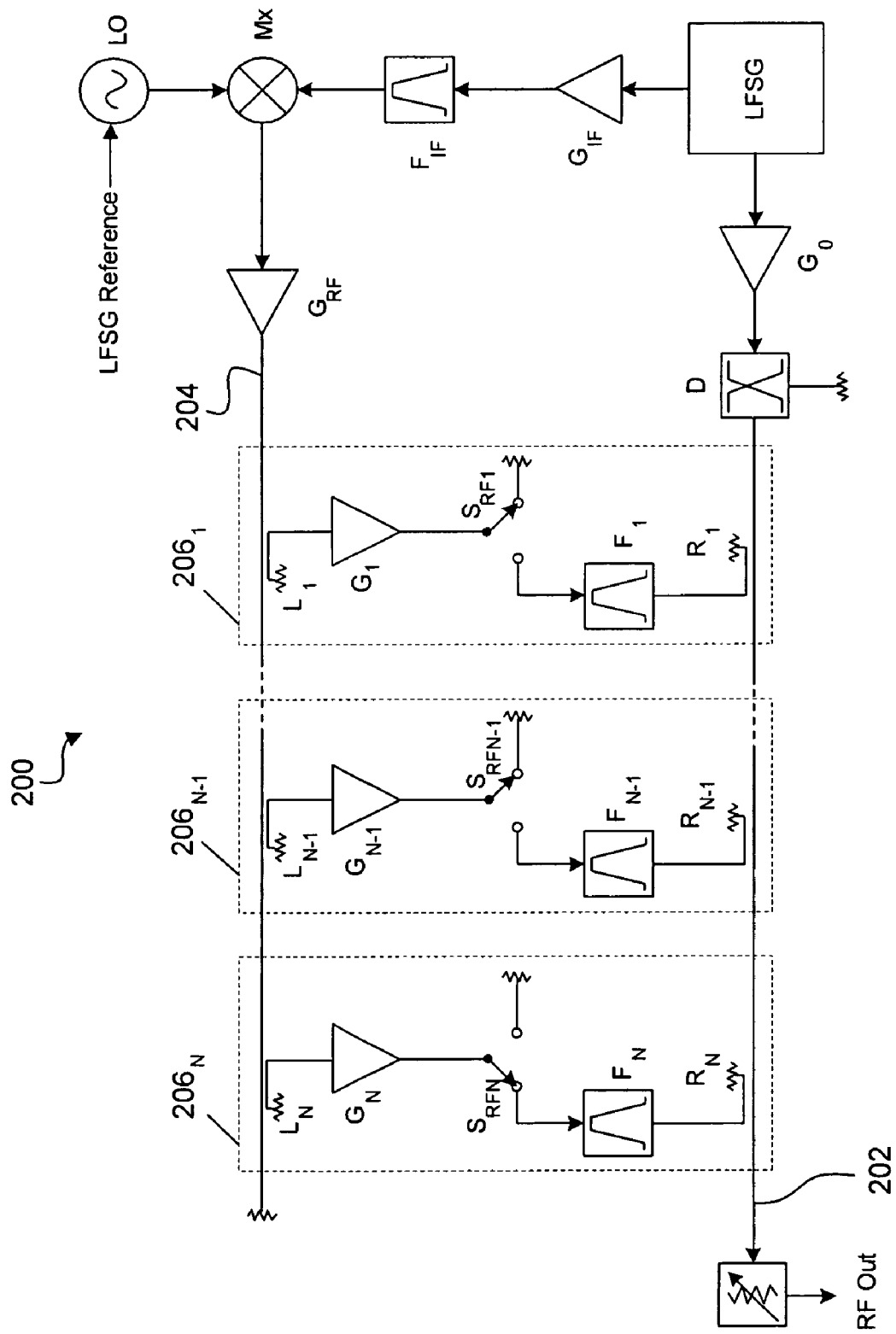
FIG. 2 is a circuit diagram of an embodiment of a system in accordance with the present invention to extend an operating bandwidth of a signal generator.

FIG. 2 is a circuit diagram of an embodiment of a system 200 in accordance with the present invention to extend an operating bandwidth of a signal generator. The system 200 comprises a low-frequency signal generator (LFSG) and one or more coupler-filter cascades $206_i$ arranged between two transmission lines 202, 204. Coupler-filter cascades $206_i$ can supplant a switched filter as shown in FIG. 1 and reduce complexity in component design relative to a switched filter to reduce signal attenuation and component cost.

Referring to the circuit diagram, an intermediate frequency signal can be generated by the LFSG and selectably passed to a diplexer D disposed along a primary transmission line 202 or a mixer Mx. The frequency spectrum corresponding to an operating bandwidth of the system can be split into N+1 bands. The $0^{th}$ band corresponds to a frequency range of the LFSG while an $i^{th}$ (where $i=1 \rightarrow N$) band corresponds to a frequency range of the $i^{th}$ coupler-filter cascade. The intermediate frequency signal may optionally be amplified (e.g., by amplifier $G_0$, $G_{IF}$) to improve detection, and filtered (e.g., by filter $F_{IF}$) to substantially reduce spurs. If the LFSG is capable of generating a signal with a requested frequency (i.e., the requested signal falls within the $0^{th}$ band) the signal is generated and passed through the diplexer D and along the primary transmission line 202 to an output port $RF_{Out}$. If a requested frequency is higher than can be generated by the LFSG (i.e., the requested signal falls within the $i^{th}$ band), an intermediate frequency signal is passed to the mixer Mx. An LFSG-referenced local oscillator (LO) generates an additional signal and passes the signal to the mixer Mx. The additional signal of the LO beats against the intermediate frequency signal to generate a series of beat frequencies. The beat frequencies are optionally amplified (e.g., by amplifier $G_{RF}$) and passed along a secondary transmission line 204. One or more of the beat frequencies are coupled through one or more of the coupler-filter cascades $206_i$. A signal having the requested frequency is passed through a filter $F_i$ of the one or more of the coupler-filter cascades $206_i$ and coupled to the primary transmission line 202. A portion of the energy of the coupled signal can pass to the output port $RF_{Out}$; however, a portion of the energy of the coupled signal will pass to the diplexer D. The diplexer D rejects signals that are above a range of signal generation of the LFSG, passing the signal to a termination to reduce or eliminate signal reflection off of the LFSG.

A coupler-filter cascade $206_i$ has a usable bandwidth within which a signal will couple to the channel $206_i$. In an embodiment, the coupler-filter cascades $206_i$ can function over a series of bandwidths that when taken together span continuously (and contiguously) across a desired operating bandwidth of the system 200. Optionally, the usable bandwidths of the coupler-filter cascades $206_i$ can overlap. Alternatively, there can be gaps in the usable bandwidths of the coupler-filter cascades $206_i$. Two or more of the beat frequencies can be coupled with one or more common coupler-filter cascade $206_i$. For example, if a signal having a frequency of 1 GHz is generated by the LFSG and mixed with a 9 GHz signal generated by the LO, an 8 GHz signal and a 10 GHz signal can be coupled through at least a first coupler-filter cascade $206_1$. One of the signals is passed through a filter $F_1$ of the channel $206_1$ and the other signal is rejected by the filter. The passed signal is coupled to the primary transmission line 202. Optionally, a second coupler-filter cascade can have a similar or overlapping coupling bandwidth, but include a filter that passes the opposite signal while rejecting the passed signal of the first coupler-filter cascade $206_1$. A quantity, n, of coupler-filter cascades 206 can vary with operating bandwidth, filter, and mixer selection. For example, a spur plot may be helpful to plot spurious frequencies for determining pass-bands and selecting filters.

A coupler-filter cascade $206_i$ can be coupled to the main transmission lines 202, 204 by forming a prescribed length of coupler transmission line $L_i$, $R_i$ in proximity to the main transmission lines 202, 204. The coupler transmission line and main transmission line are set close enough together such that energy passing through one is coupled to the other. A frequency (or range of frequencies) of a signal for which energy is coupled is limited by the prescribed length of the coupler transmission line $L_i, R_i$. The prescribed length is chosen to yield maximum coupling at the center of the desired band. The coupler transmission line is a passive component that can be fabricated using semiconductor or printed circuit board (PCB) technology, for example. Coupler transmission lines having prescribed lengths ranging from microns (or sub-micron) to several inches can be fabricated to provide a broad range of frequency coupling relative to multi-switch technology.

In a preferred embodiment, the coupler-filter cascades $206_i$ can further comprise a switch $S_{RFi}$ to isolate the coupler-filter cascades $206_i$ from the primary transmission line 202. The switch $S_{RFi}$ can be a simple switch that switches one or two paths. Use of couplers can reduce a number of signal paths through which a signal can be passed, reducing signal loss at high frequencies that can occur with more complex signal routing schemes requiring multiple switches to be cascaded. In the example given above, coupler-filter cascades have overlapping bandwidth, but filters that pass frequencies that are coincidentally generated can be selectively isolated by respective switches so that a desired frequency is passed and the non-desired frequency is rejected, rather than both frequencies passing through different channels (and therefore being effectively unfiltered). In other embodiments, the coupler-filter cascades $206_i$ need not comprise a switch. For example, filters $F_1$ to $F_N$ can be chosen such that a desired frequency of the beat frequencies created in the mixer Mx will pass through the filters. Thus, for example if the desired frequency is passed by $F_5$, then non-desired frequencies created in the mixer Mx cannot fall into the passbands of $F_{1-4}$ and $F_{6-N}$. However, typically a switch can provide improved isolation relative to a filter; although in some embodiments, a signal passed through respective filters $F_1$ to $F_N$ may be satisfactory, such that a switch may not provide additional benefit.

Figure 3:
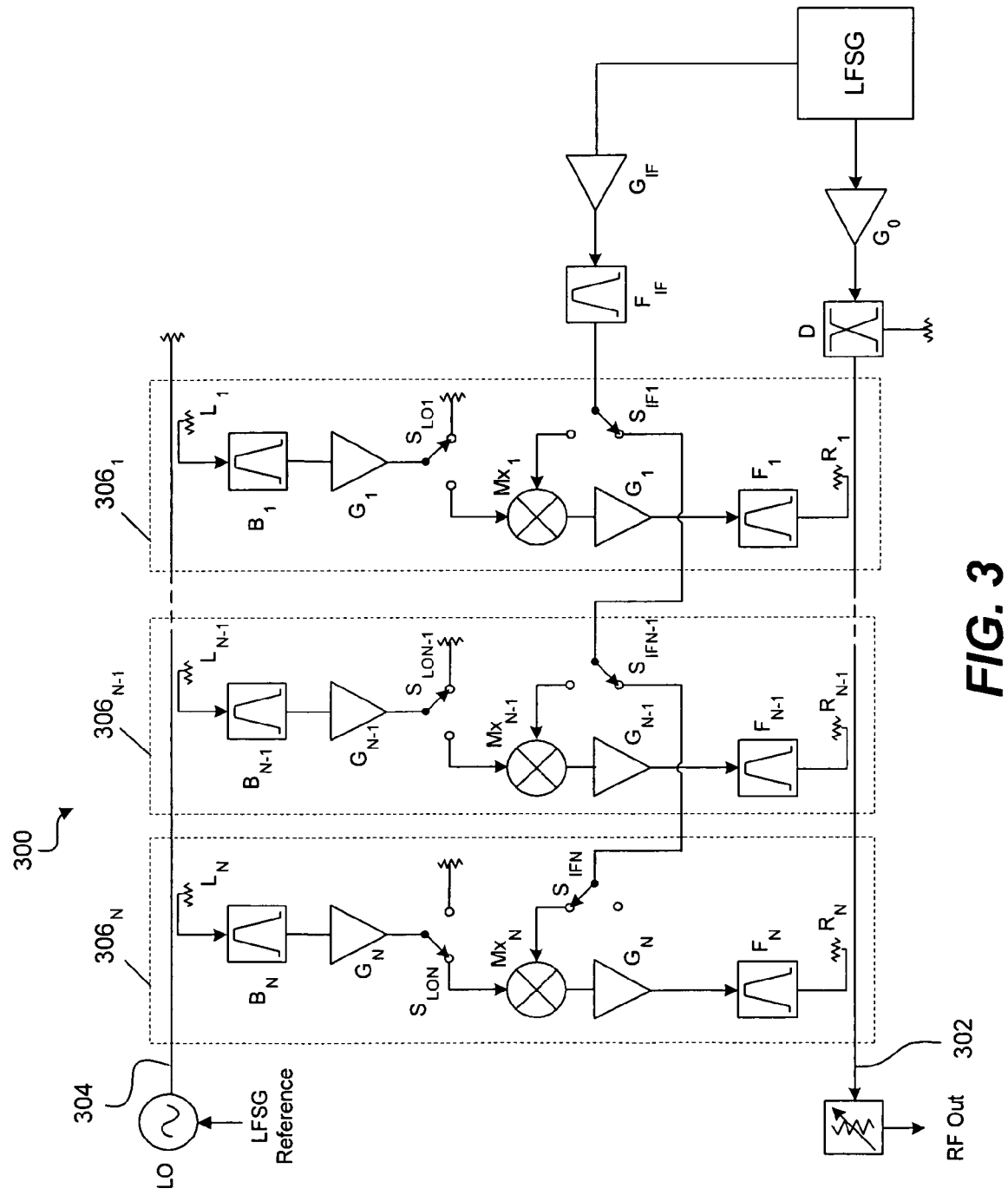
FIG. 3 is a circuit diagram of an alternative embodiment of a system in accordance with the present invention to extend an operating bandwidth of a signal generator.

Referring to FIG. 3, a circuit diagram of an alternative embodiment of a system 300 in accordance with the present invention to extend an operating bandwidth of a signal generator is shown. The system comprises an LFSG and one or more coupler-filter cascades $306_i$ arranged between two transmission lines 302, 304. The coupler-filter cascades $306_i$ can supplant a switched filter and include a mixer $Mx_i$ adapted to generate a range of frequencies. The mixers $Mx_i$ can vary in the range of generated frequencies to further extend a collective bandwidth of the system, or alternatively to generate a series of smaller bandwidths of frequencies (relative to a mixer of FIG. 2) which collectively generate a desired bandwidth. Including multiple mixers of smaller bandwidth that collectively span a bandwidth of fewer mixers (e.g., a single mixer) can reduce an overall cost of the system where multiple selected, smaller bandwidth mixers are simpler to fabricate than a single, large bandwidth mixer. Further, including a mixer $Mx_i$ in the coupler-filter cascade $306_i$ can enable placement of the mixer $Mx_i$ in closer proximity along the transmission line to the output port $RF_{Out}$, potentially reducing attenuation of a generated signal, thereby providing a higher signal level at the output port $RF_{Out}$.

Referring to the circuit diagram, an intermediate frequency signal can be generated by the LFSG and selectably passed to a diplexer D disposed along a primary transmission line 302 or selectively passed to a mixer $Mx_i$ of a coupler-filter cascade $306_i$. As above, the frequency spectrum corresponding to an operating bandwidth of the system can be split into N+1 bands. The $0^{th}$ band corresponds to a frequency range of the LFSG, while an $i^{th}$ (where i=1→N) band corresponds to a frequency range of the $i^{th}$ coupler-filter cascade. The intermediate frequency signal may optionally be amplified (e.g., by way of an amplifier $G_0, G_{IF}$) to improve detection, and filtered (e.g., by way of filter $F_{IF}$) to improve signal condition. If the LFSG is capable of generating a signal with a requested frequency (i.e., the requested signal falls within the $0^{th}$ band), the signal is generated and passed through the diplexer D and along the primary transmission line 302 to an output port $RF_{Out}$. If a requested frequency is higher than can be generated by the LFSG (i.e., the requested signal falls within the $i^{th}$ band), an intermediate frequency signal is passed to a mixer $Mx_i$ by a switch $S_{IFi}$ connecting the LFSG to one or more of the coupler-filter cascades $306_i$.

An LFSG-referenced local oscillator (LO) generates an additional signal along the secondary transmission line 304 that is coupled to one or more of the coupler-filter cascades $306_i$, passed through a filter $B_i$ and optionally amplified (e.g., by way of an amplifier $G_i$ to increase signal strength). The LO signal is passed to the mixer $Mx_i$ by a switch $S_{LOi}$ and beats against the intermediate frequency signal to generate a series of beat frequencies. The beat frequencies are optionally amplified (e.g., by amplifier $G_i$) and passed to a filter $F_i$ of the channel $306_i$ which filter passes signals within a range of frequencies and rejects other signals outside of the range of frequencies. The passed signal is coupled to the primary transmission line 302. A portion of the energy of the coupled signal can pass to the output port $RF_{Out}$; however, a portion of the energy of the coupled signal will pass to the diplexer D. The diplexer D rejects signals that are above a range of signal generation of the LFSG, passing the signal to a termination to reduce or eliminate signal reflection off of the LFSG.

Although as shown in FIG. 3, the system includes switches $S_{IFi}, S_{LOi}$ for selectively isolating the coupler-filter cascades $306_i$, in other embodiments bias can be introduced into to selected mixers $Mx_i$ that can cause the mixer $Mx_i$ to function as a switch, effectively "turning off" the mixers of the selected coupler-filter cascades $306_i$. Such a scheme can allow switches $S_{IFi}, S_{LOi}$ to be eliminated where doing so, acceptable performance is achieved.

As above, in an embodiment, the coupler-filter cascades $306_i$ can function over a series of bandwidths that when taken together span continuously (and contiguously) across a desired operating bandwidth of the system. Optionally, the usable bandwidths of the coupler-filter cascades $306_i$ can overlap. Alternatively, there can be gaps in the usable bandwidths of the coupler-filter cascades $306_i$. A quantity, n, of coupler-filter cascades 306 can vary with operating bandwidth, filter, and mixer selection. For example, a spur plot may be helpful to plot spurious frequencies for determining passbands and selecting filters.

A coupler-filter cascade $306_i$ can be coupled to the main transmission lines 302, 304 by forming a prescribed length of coupler transmission line $L_i$, $R_i$ in proximity to each of the main transmission lines 302, 304. The coupler transmission line and main transmission line are set close enough together such that energy passing through one is coupled to the other. A frequency (or range of frequencies) of a signal for which energy is coupled is limited by the prescribed length of the coupler transmission line $L_i$, $R_i$. The coupler transmission line is a passive component that can be fabricated by semiconductor or printed circuit board (PCB) technology, for example. Coupler transmission lines having prescribed lengths ranging from microns (or sub-micron) to several inches can be fabricated to provide a broad range of frequency coupling relative to multi-switch technology.

The foregoing description of the present invention has been presented for purposes of illustration and description. It is not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A system to extend an operating bandwidth of a signal generator comprising:
   a signal generator;
   an output port;
   a first transmission line extending between the signal generator and the output port;
   a mixer adapted to receive a first signal from the signal generator;
   a local oscillator adapted to provide a second signal to the mixer to beat against the first signal;
   a second transmission line extending from the mixer to transmit a plurality of output signals of the mixer; and
   one or more channels couplable between the first transmission line and the second transmission line, the one or more channels including:
      a first coupler having a length adapted to couple one or more of the output signals within a band of frequencies from the second transmission line to the channel,
      a second coupler having a length adapted to couple the one or more of the output signals from the channel to the first transmission line, and
      a filter arranged between the first coupler and the second coupler.

2. The system of claim 1, further comprising a diplexer arranged along the first transmission line between the signal generator and the second coupler of the one or more channels.

3. The system of claim 1, wherein the one or more channels further includes a switch arranged between the first coupler and the second coupler.

4. The system of claim 1, further comprising an intermediate frequency amplifier and an intermediate frequency filter arranged between the signal generator and the mixer.

5. The system of claim 1, further comprising an amplifier arranged along the second transmission line between the mixer and the first coupler of the one or more channels.

6. The system of claim 1, wherein the one or more channels further includes an amplifier arranged between the first coupler and the second coupler.

7. The system of claim 1, wherein the local oscillator is referenced to the signal generator.

8. A system to extend an operating bandwidth of a signal generator comprising:
   a signal generator to generate a first signal;
   an output port;
   a first transmission line extending between the signal generator and the output port;
   a local oscillator adapted to provide a second signal;
   a second transmission line extending from the local oscillator to transmit a the second signal; and
   one or more channels couplable between the first transmission line and the second transmission line, the one or more channels including:
      a first coupler having a length adapted to couple one or more of the frequencies of the second signal within a band of frequencies from the second transmission line to the channel,
      a mixer connectable with the signal generator to receive the first signal, the mixer adapted to receive the second signal coupled to the channel by the first coupler and generate a plurality of output signals;
      a second coupler having a length adapted to couple one or more of the output signals of the mixer from the channel to the first transmission line, and
      a filter arranged between the first coupler and the second coupler.

9. The system of claim 8, further comprising a diplexer arranged along the first transmission line between the signal generator and the second coupler of the one or more channels.

10. The system of claim 8, wherein the one or more channels further includes a switch arranged between the first coupler and the second coupler.

11. The system of claim 8, further comprising an intermediate frequency amplifier and an intermediate frequency filter arranged between the signal generator and the mixer.

12. The system of claim 8, wherein the one or more channels further includes a filter arranged between the first coupler and the mixer.

13. The system of claim 8, wherein the one or more channels further includes an amplifier arranged between the first coupler and the mixer.

14. The system of claim 8, wherein the mixer is connectable with the signal generator by a switch.

15. The system of claim 8, wherein the one or more channels further includes an amplifier arranged between the mixer and the second coupler.

16. The system of claim 8, wherein the local oscillator is referenced to the signal generator.

17. A method of extending an operating bandwidth of a signal generator comprising:
   generating a first signal with a signal generator;
   mixing the first signal with a second signal from a local oscillator in a mixer;
   outputting a plurality of output signals from the mixer to a first transmission line;
   providing a plurality of channels couplable to one or more output signals within a band of frequencies;
   wherein the band of frequencies couplable to a respective channel varies between the plurality of channels;
   coupling one or more of the output signals within a band of frequencies from the first transmission line to a channel from the plurality of channels;
   filtering the one or more of the output signals;
   coupling the filtered output signals from the channel to a second transmission line; and
   transmitting the filtered output signals to an output.

18. The method of claim 17 wherein the bands of frequencies for the plurality of channels are contiguous.

19. The method of claim 17 wherein the bands of frequencies for the plurality of channels are non-contiguous.

* * * * *